(12) United States Patent
Taghizadeh Motlagh et al.

(10) Patent No.: US 12,659,206 B2
(45) Date of Patent: Jun. 16, 2026

(54) APPARATUSES AND METHODS FOR SENSING REFERENCE SIGNAL MULTIPLEXING VIA SUPERIMPOSITION

(71) Applicant: Lenovo (Singapore) Pte. Ltd., Singapore (SG)

(72) Inventors: Seyedomid Taghizadeh Motlagh, Oberursel (DE); Razvan-Andrei Stoica, Witten (DE); Ali Ramadan Ali, Kraiburg am Inn (DE); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 58 days.

(21) Appl. No.: 18/860,866

(22) PCT Filed: May 1, 2023

(86) PCT No.: PCT/IB2023/000235
§ 371 (c)(1),
(2) Date: Oct. 28, 2024

(87) PCT Pub. No.: WO2023/209438
PCT Pub. Date: Nov. 2, 2023

(65) Prior Publication Data
US 2025/0337625 A1 Oct. 30, 2025

Related U.S. Application Data

(60) Provisional application No. 63/336,462, filed on Apr. 29, 2022.

(51) Int. Cl.
H04L 27/26 (2006.01)
H04L 5/00 (2006.01)
H04W 72/232 (2023.01)

(52) U.S. Cl.
CPC .......... H04L 27/261 (2013.01); H04L 5/0016 (2013.01); H04W 72/232 (2023.01)

(58) Field of Classification Search
CPC ... H04L 5/0053; H04L 27/261; H04L 5/0016; H04L 5/006; H04W 72/232
See application file for complete search history.

(56) References Cited

U.S. PATENT DOCUMENTS

| | | | | | |
|---|---|---|---|---|---|
| 11,159,357 | B1 * | 10/2021 | Cui | ........................ | H04L 27/18 |
| 11,700,100 | B2 | 7/2023 | Taghizadeh Motlagh et al. | | |

(Continued)

FOREIGN PATENT DOCUMENTS

| | | |
|---|---|---|
| EP | 2426971 A1 | 3/2012 |

OTHER PUBLICATIONS

PCT/IB2023/000235, "Notification of Transmittal of the International Search Report and the Written Opinion of the International Searching Authority, or the Declaration", International Searching Authority, Sep. 7, 2023, pp. 1-10.

(Continued)

*Primary Examiner* — Dac V Ha
(74) *Attorney, Agent, or Firm* — Kunzler Needham Hilton

(57) ABSTRACT

An apparatus, system, and method for improving signal communications in a sensing scenario. A first configuration for a sensing reference signal (RS) and a second configuration for receiving another signal at a first device from a second device. The first and second configurations identify a sharing of resources for allowing the sensing RS to be at least partially superimposed with the another signal. Responsive to a first device being a transmitting device, a first transmission of the sensing RS and the another signal based on the first and second configurations is generated. Responsive to the first device being identified as a receiving device, a second transmission is received from a third (Continued)

device. The second transmission includes the sensing RS and the another signal based on the first and second configurations.

20 Claims, 7 Drawing Sheets

(56)                    References Cited

U.S. PATENT DOCUMENTS

| | | | |
|---|---|---|---|
| 12,356,459 B2 * | 7/2025 | Harada | H04B 7/06966 |
| 12,463,764 B2 * | 11/2025 | Duan | H04L 5/0092 |
| 2015/0327244 A1 | 11/2015 | Pajukoski et al. | |
| 2023/0171053 A1 | 6/2023 | Taghizadeh Motlagh et al. | |
| 2023/0353296 A1 * | 11/2023 | Eldessoki | H04J 11/0053 |
| 2024/0192308 A1 | 6/2024 | Taghizadeh Motlagh et al. | |

OTHER PUBLICATIONS

A.T. Asyhari et al., "Orthongonal or Superimposed Pilots? A Rate-Efficient Channel Estimation Strategy for Stationary MIMO Fading Channels", IEEE Transactions on Wireless Communications, vol. 16 Issue: 5, Mar. 17, 2017, pp. 2776-2789.
D. Verenzuela et al., "Spectral and Energy Efficiency of Superimposed Pilots in Uplink Massive MIMO", IEEE Transactions on Wireless Communications, vol. 17, Issue: 11, Aug. 6, 2018, pp. 7099-7115.

* cited by examiner

200

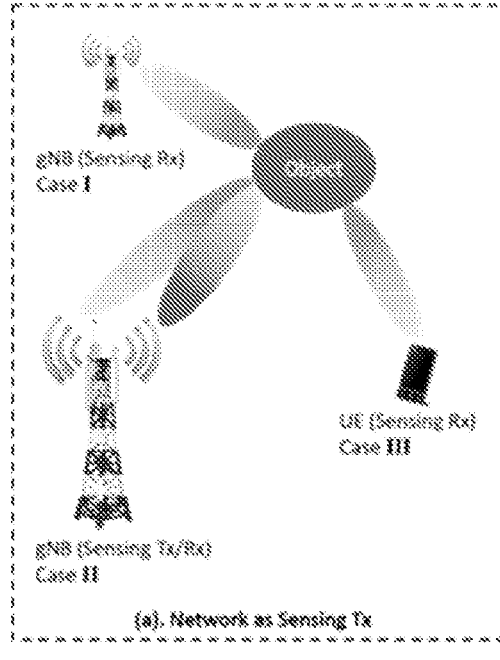
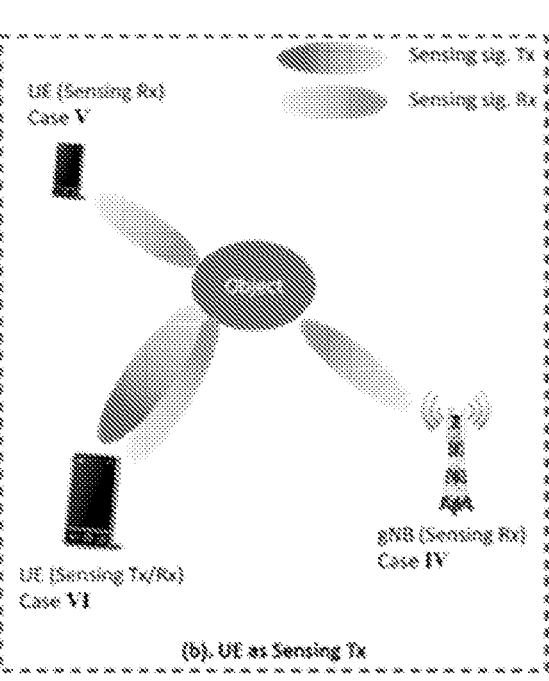
FIG. 4-1                    FIG. 4-2

502  Sensing RS

504  Other RS or data/control channel

Superimposition of sensing RS and physical channels

500

506

508

510

512

514

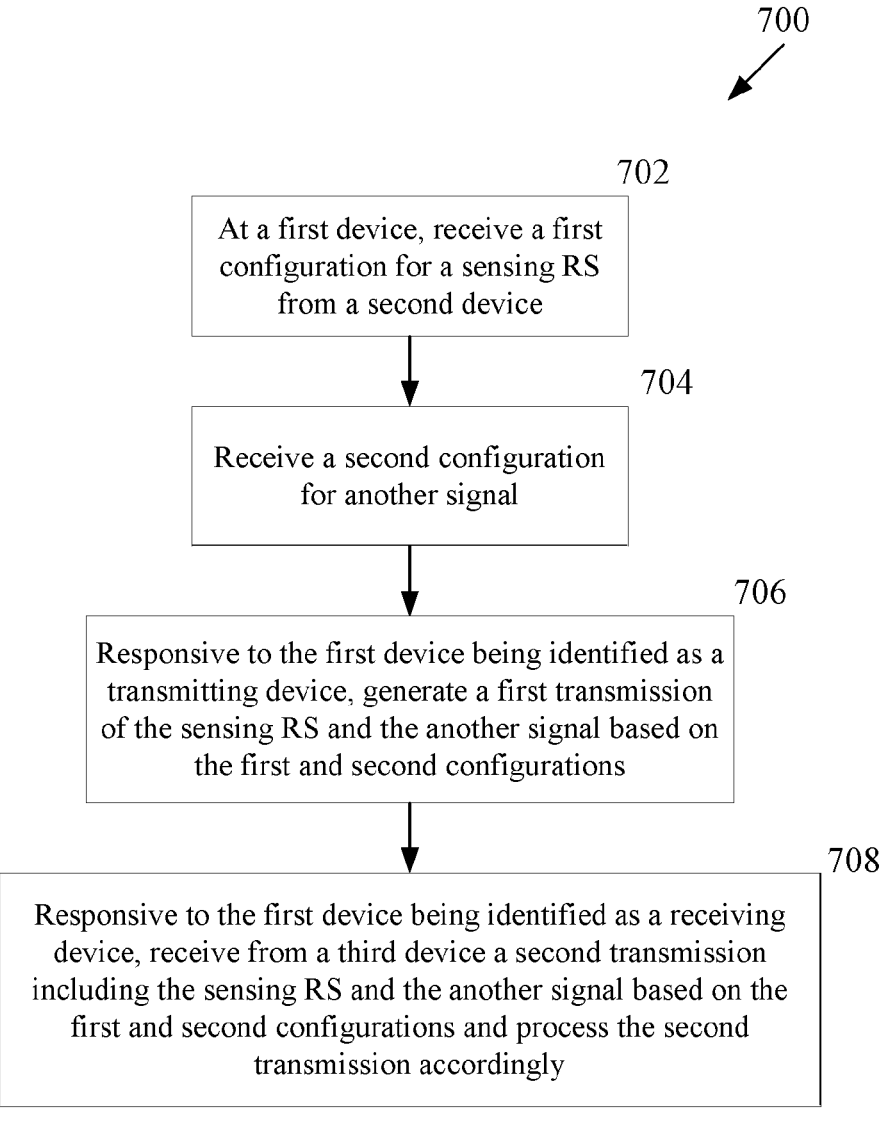

700

702

At a first device, receive a first configuration for a sensing RS from a second device

704

Receive a second configuration for another signal

706

Responsive to the first device being identified as a transmitting device, generate a first transmission of the sensing RS and the another signal based on the first and second configurations

708

Responsive to the first device being identified as a receiving device, receive from a third device a second transmission including the sensing RS and the another signal based on the first and second configurations and process the second transmission accordingly

FIG. 7

APPARATUSES AND METHODS FOR SENSING REFERENCE SIGNAL MULTIPLEXING VIA SUPERIMPOSITION

CROSS-REFERENCE TO RELATED APPLICATIONS

This application claims the benefit of U.S. Provisional Patent Application No. 63/336,462 entitled "APPARATUSES AND METHODS FOR SENSING REFERENCE SIGNAL MULTIPLEXING VIA SUPERIMPOSITION" and filed on Apr. 29, 2022, for Seyedomid Taghizadeh Motlagh, et al., which is incorporated herein by reference.

FIELD OF THE INVENTION

This invention relates to communicating reference information to nodes of a network.

BACKGROUND OF THE INVENTION

The following abbreviations are herewith defined, at least some of which are referred to within the following description.

In order to enable radio sensing capability within the communication network, a sensing reference signal (RS) needs to be defined and configured for Sensing Tx (transmission) nodes and Sensing Rx nodes in accordance with the requirements of a specific sensing task, the available network/user equipment (UE) capabilities for sensing measurement/processing and the available resources that can be used for sensing, while allowing for the communicating network function to continue without degradation.

In various embodiments, depending on the nature of the specific sensing scenarios and the required sensing quality of service (QOS), the sensing RS may need to span over a long-time duration and/or to span over a large bandwidth. For instance, if a high-resolution ranging is of interest, e.g., for safety applications, the sensing RS needs to span over a large bandwidth. When a high velocity resolution is of interest and/or the object/target is moving with low velocity, a larger observation time is needed. In this case, the sensing RS needs to span over a longer time duration. For the scenarios when both of the aforementioned requirements are present, for a high-resolution ranging and velocity estimation of an almost static object/target, e.g., in pedestrian ranging and movement prediction for safety applications, a sensing RS needs to span over a sufficiently large bandwidth to facilitate the desired ranging resolution, while at the same time, to span over a sufficiently large time duration to facilitate velocity resolution. Resources (in time, frequency, code domain) used for these types of sensing RSs may lead to an unnecessarily high resource expenditure, both in terms of the time/frequency resources, as well as the total energy contained within the dedicated sensing RS.

SUMMARY

Apparatuses, systems, and methods for improving signal communications in a sensing scenario is disclosed.

In an illustrative embodiment, a method performed at a first device receives a first configuration for a sensing reference signal (RS) and a second configuration for another signal from a second device. The first and second configurations identify a sharing of resources for allowing the sensing RS to be at least partially superimposed with the another signal. Responsive to a first device being identified as a transmitting device, a first transmission of the sensing RS and the another signal based on the first and second configurations is generated. Responsive to the first device being identified as a receiving device, a second transmission is received from a third device. The second transmission includes the sensing RS and the another signal based on the first and second configurations. Responsive to receiving the second transmission, the second transmission is processed based on the first and second configurations.

In another illustrative embodiment, an apparatus, chosen from a user equipment and a network node, includes a transmitter, a receiver configured to receive a first configuration for a sensing RS and receive a second configuration for another signal, wherein the first and second configurations identify a sharing of resources for allowing the sensing RS to be at least partially superimposed with the another signal, and a processor coupled to the receiver and the transmitter. The processor responsive to the apparatus being identified as a transmitting device, generates a first transmission of the sensing RS and the another signal based on the first and second configurations and responsive to the apparatus being identified as a receiving device, instructs the receiver to receive from a third device a second transmission including the sensing RS and the another signal based on the first and second configurations and process the received second transmission based on the first and second configurations.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4-1 is a schematic diagram illustrating various radio sensing scenarios;

FIG. 4-2 is a schematic diagram illustrating various radio sensing scenarios;

FIG. 5-1 is a block diagram illustrating a first superimposition scenario;

FIG. 5-2 is a block diagram illustrating a second superimposition scenario;

FIG. 5-3 is a block diagram illustrating a third superimposition scenario;

FIG. 6-1 is a is a block diagram illustrating a first transmission with RS beam variation;

FIG. 6-2 is a block diagram illustrating a second transmission with RS beam variation;

FIG. 6-3 is a block diagram illustrating a third transmission with RS beam variation; and FIG. 7 is a schematic flow chart diagram illustrating one embodiment of a method for superimposing sensing reference signals.

DETAILED DESCRIPTION OF THE INVENTION

Figure 1:
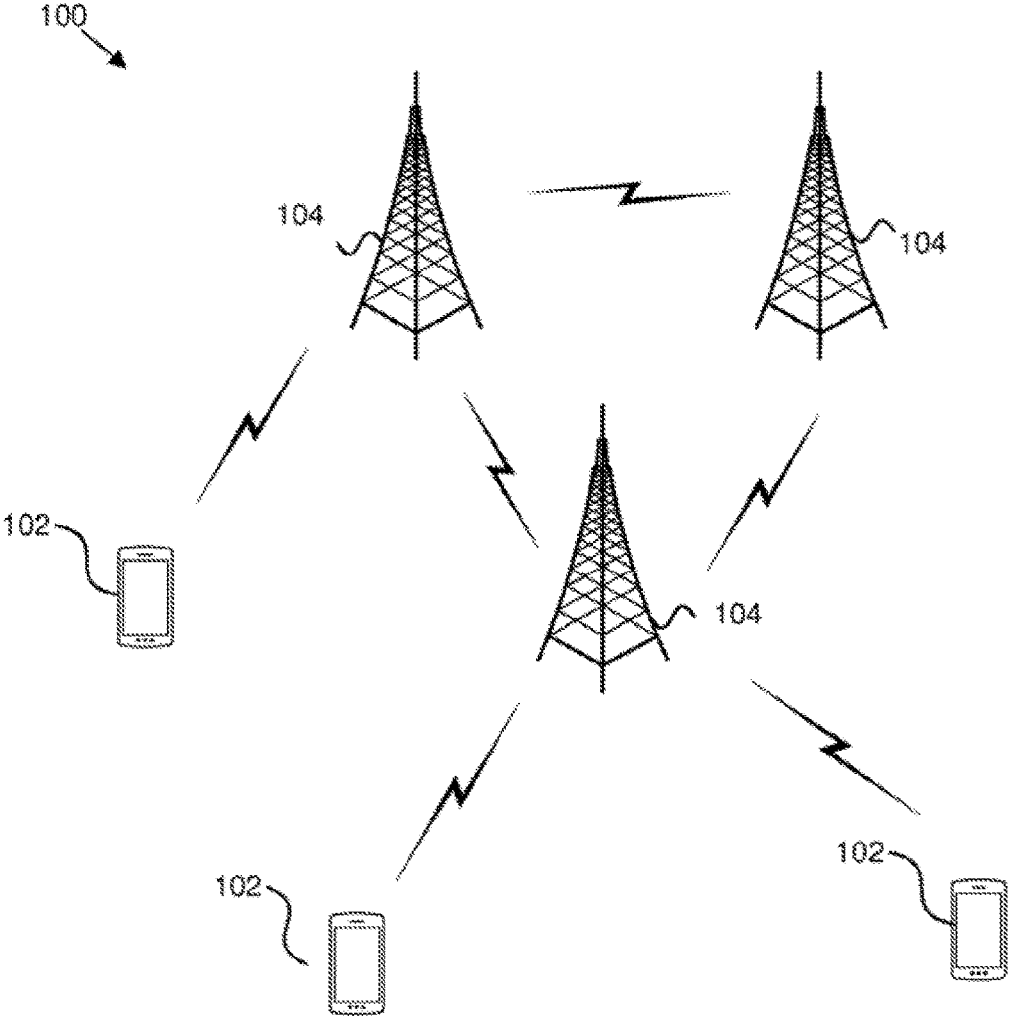
FIG. 1 is a schematic block diagram illustrating one embodiment of a wireless communication system for superimposing sensing reference signals.

As will be appreciated by one skilled in the art, aspects of the embodiments may be embodied as a system, apparatus, method, or program product. Accordingly, embodiments may take the form of an entirely hardwire embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in the specification may be labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program product according to embodiments. It will be understood that each block of the schematic flowchart diagrams and/or schematic block diagrams, and combinations of blocks in the schematic flowchart diagrams and/or schematic block diagrams, can be implemented by code. These codes may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagram block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for flexible uplink/downlink transmissions. In one embodiment, the wireless communication system 100 includes remote units (UEs) 102 and base units (network nodes (gNBs)) 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, or by other terminology used in the art. The remote units 102 may communicate directly with one or more of the base units 104 via uplink (UL) communications signals.

The base units 104 may be distributed over a geographic region. In certain embodiments, a base unit 104 may also be referred to as an access point, an access terminal, a base, a base station, gNB, a Node-B, an eNB, a Home Node-B, a relay node, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one embodiment, the wireless communication system 100 is compliant with the long term evolution (LTE) of the third generation partnership project (3GPP) universal mobile telecommunications system (UMTS) protocol, wherein the base units 104 transmit using an orthogonal frequency division multiplexing (OFDM) modulation scheme on the DL and the remote units 102 transmit on the UL using a single carrier frequency division multiple access (SC-FDMA) scheme. More generally, however, the wireless communication system 100 may implement some other open or proprietary communication protocol, for example, worldwide interoperability for microwave access (WiMAX), among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may determine a frame period length for communication with a remote unit 102. The base unit 104 may determine an uplink/downlink split pattern to use with the determined frame period length. Moreover, the base unit 104 forms at least one message indicating the frame period length and the uplink/downlink split pattern. In addition, the base unit 104 may provide the at least one message to the remote unit 102. In certain embodiments, the remote unit 102 may receive the at least one message. In addition, the remote unit 102 may determine the frame period length for communication based on the at least one message. Furthermore, the remote unit 102 may determine the uplink/downlink split pattern based on the at least one message. The remote unit 102 may transmit UL subframes based on the frame period length and the uplink/downlink split pattern. The remote unit 102 may also receive downlink (DL) subframes based on the frame period length and the uplink/downlink split pattern.

Figure 2:
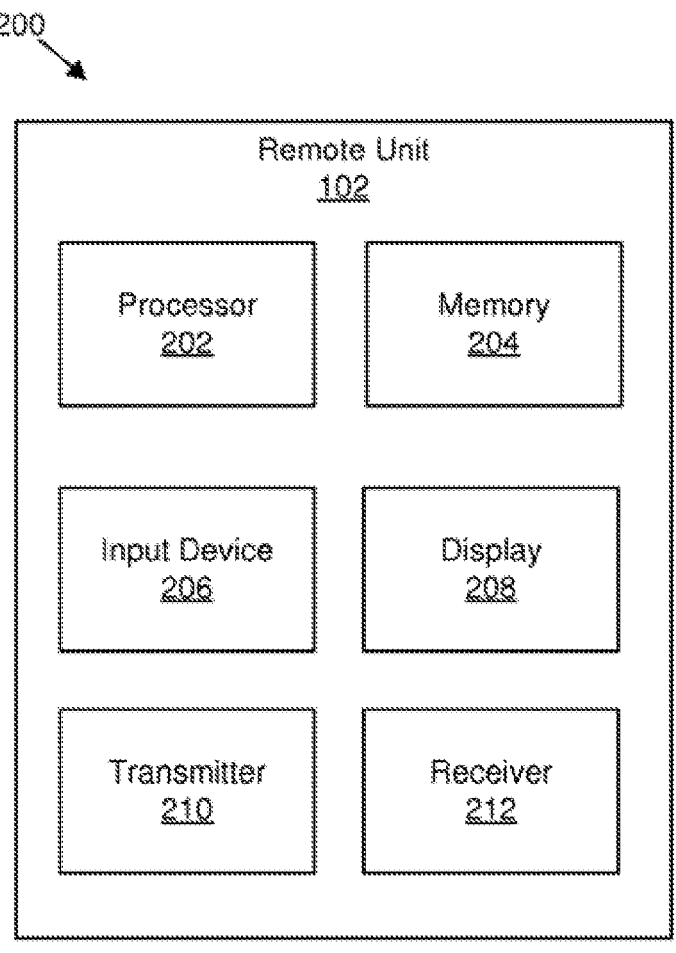
FIG. 2 is a schematic block diagram illustrating one embodiment of an apparatus that may be used for superimposing sensing reference signals.

FIG. 2 depicts one embodiment of an apparatus 200 that may be used for flexible uplink/downlink transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to frame period lengths and/or uplink/downlink split patterns. In some embodiments, the memory 204 also stores program code and related data, such as an operating system, or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, and LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen of similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit UL subframes based on a frame period length and an uplink/downlink split pattern. In another embodiment, the receiver 212 may receive at least one message sent by the base unit 104. Furthermore, the receiver 212 may receive DL subframes based on the frame period length and the uplink/downlink split pattern. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
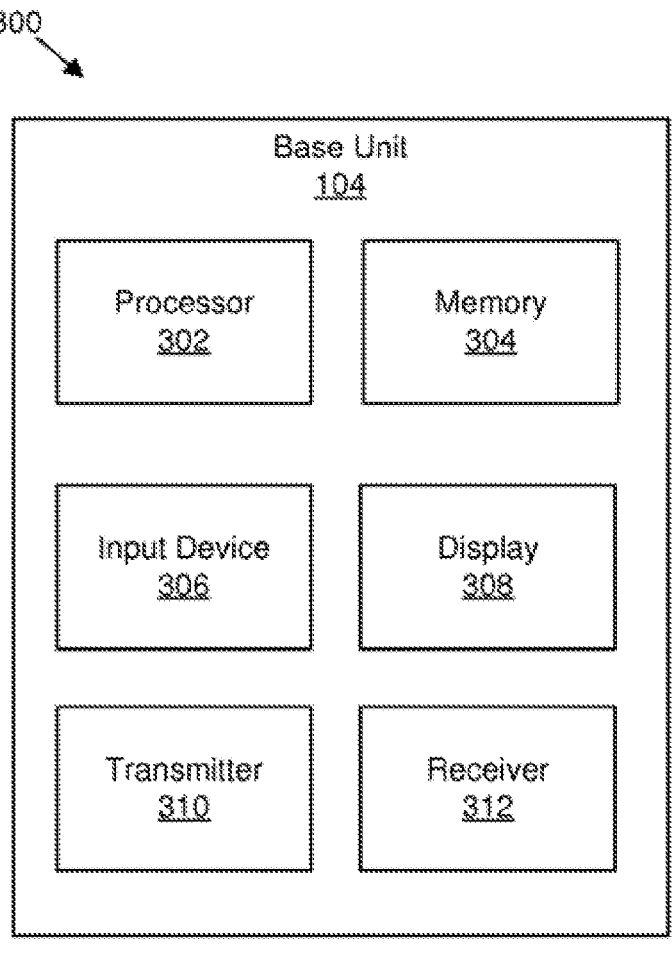
FIG. 3 is a schematic block diagram illustrating another embodiment of an apparatus that may be used for superimposing sensing reference signals.

FIG. 3 depicts another embodiment of an apparatus 300 that may be used for flexible uplink/downlink transmissions. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

The transmitter 310 is used to provide DL communication signals to the remote unit 102 and the receiver 312 is used to receive UL communication signals from the remote unit 102. In one embodiment, the transmitter 310 is used to provide at least one message to the remote unit 102 (e.g., UE). Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, a sensing RS may be transmitted at the same time/frequency/code resources (superimposed) as other communication signals and with an adjusted sensing RS energy to facilitate re-use of the time/frequency/code resources dedicated for communication while avoiding destructive interference impact due to coexistence. In addition to the above, the superimposed sensing RS, due to the larger dimension of the code space, is of practical interest when a large number of distinct sensing tasks shall be done at the same time and remain separable.

Radio Sensing Scenarios

Functional split between the network and the UE nodes for a specific sensing task may take various forms, depending on the availability of sensing-capable devices and the requirements of a specific sensing operation. FIGS. 4-1 and 4-2 show the different radio sensing cases below.

I. Sensing Tx at a network node and Sensing Rx at a separate network node: in this case, a sensing RS (or another RS used for sensing or the data/control channels known to the network nodes) is transmitted and received by network entities (the base units 104). The involvement of UE (the remote units 102) is limited to aspects of interference management, when necessary. The network does not utilize UEs for sensing assistance in this scenario.

II. Sensing Tx at a network node and Sensing Rx at the same network node: the sensing RS (or another RS used for sensing or the data/control channels known to the network nodes) is transmitted and received by the same network entity (a single one of the base units 104). The involvement of UEs is limited to the aspects of interference management, when necessary. The network does not utilize UEs for sensing assistance in this scenario.

III. Sensing Tx at network node and Sensing Rx at a UE: in this case, the sensing RS or other RS used for sensing is transmitted by a network entity and received by one or multiple UEs. The network configures the UEs to act as a sensing receive (Rx) node, according to the UE's capabilities for sensing, as well as desired sensing task.

IV. Sensing Tx at a UE and Sensing Rx at a network node: in this case, the sensing RS or other RS used for sensing (or a data/control channel transmitted by the UE) is received by one or multiple network entities and transmitted by a UE. The network configures the UE to act as a sensing Tx node, according to the UE's capabilities for sensing, as well as the nature of the desired sensing task.

V. Sensing Tx at a UE and Sensing Rx at a separate UE: in this case, the sensing RS or other RS used for sensing is received by one or multiple UEs and transmitted by a UE. In this case, the network, or a UE may potentially decide on configuration of the sensing scenario. In one instance, the network configures the UEs to act as a sensing Tx and/or sensing Rx nodes, according to the UE's capabilities for sensing, as well as the nature of the desired sensing task.

VI. Sensing Tx at a UE and Sensing Rx at the same UE: in this case, the sensing RS (or another RS used for sensing or the data/control channels known to the UE) is transmitted by a UE and received by the same UE. In this case, the UE or the network configures the sensing scenario, according to the UE's capabilities for sensing, as well as the nature of the desired sensing task.

Superimposed Sensing RS Transmission and Reception

In one embodiment, the sensing RS for transmission and/or reception coexist, i.e., share at least partially the same time resources and/or frequency resources, with other sensing RS, other reference signals, physical data, control channels, or a combination thereof. As such, the sensing RS that is shared or superimposed is not orthogonal to the coexisting RS, the other sensing RS, the physical data, or the control channels in a time domain, in a frequency domain, and/or in a code domain.

In some embodiments, the configuration of sensing RS for a sensing Rx includes a first set of time/frequency resource pattern for sensing RS and a second set of time/frequency resource pattern for which the sensing RS is superimposed with another signal. In some other embodiments, the configuration of the sensing RS for a sensing Rx includes a first set of time/frequency resource pattern for sensing RS and a second set of time/frequency resource pattern for which the sensing RS is not superimposed with another signal.

In some embodiments, a set of transmit power levels are separately indicated for different parts of the sensing RS. In one embodiment, the transmits power for the parts of the sensing RS which are superimposed with another signal is X dB smaller than the sensing RS within the non-superimposed regions, where X is indicated to the sensing RS transmitter or receiver node. In some embodiment, when the sensing RS is superimposed with a first signal at a first set of time/frequency resources and superimposed with a second signal at a second set of time/frequency resources, multiple set of time/frequency resources are indicated to describe superimposition with different signals, together with different values of X and/or transmit power levels corresponding to the different time/frequency resources.

Figures 1, 2, 3, 5:
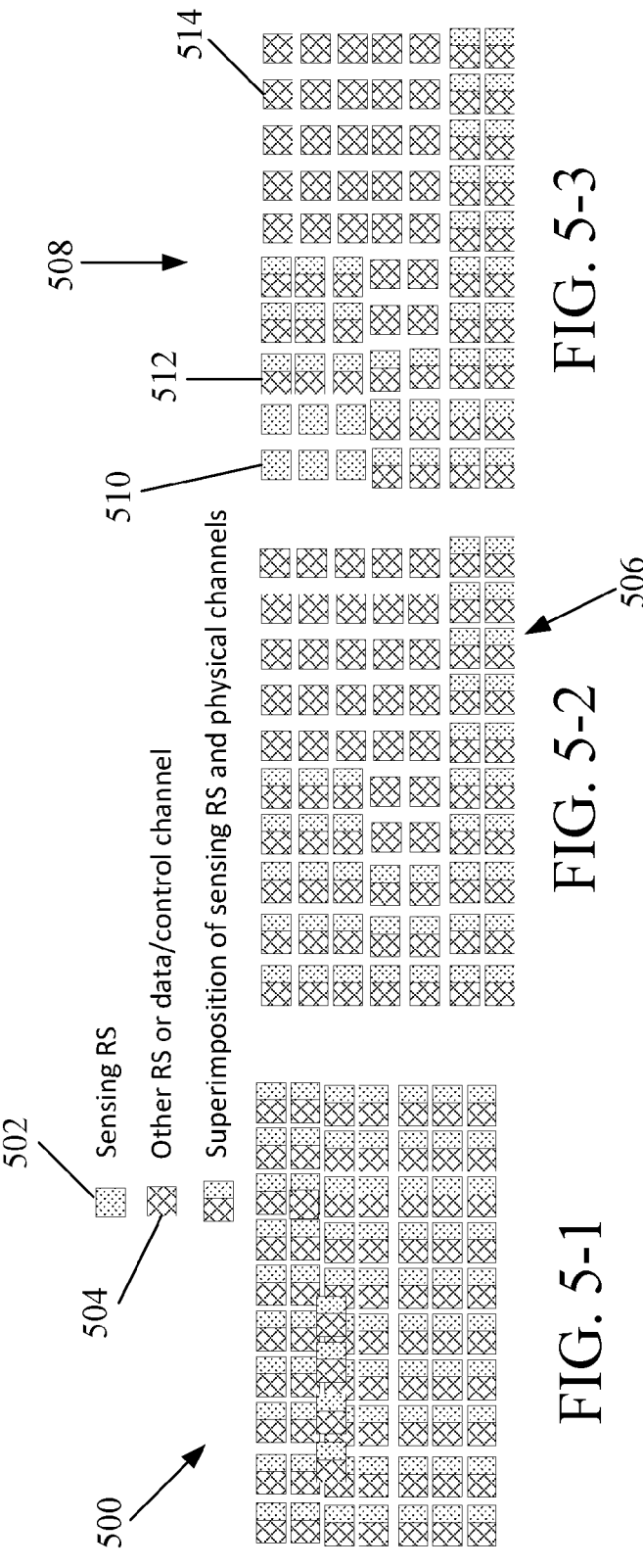

Examples of the superimposed sensing RS with other symbols/physical channels is depicted in FIGS. 5-1 thru 5-3. In one embodiment, FIG. 5-1 indicates a first superimposition 500 of the resources where all sensing RSs 502 are superimposed with other (one or multiple) RS and/or physical data/control channels 504 within a time-frequency block. In one embodiment, FIG. 5-2 indicates a second superimposition 506 of the sensing RS 502 at a sub-set of time and/or frequency domain resources, where (a portion of) a data/control channel 504 or a set of known reserved resources are excluded/protected from being superimposed. In one embodiment, FIG. 5-3 shows a combination 508 of the non-superimposed sensing RS 510 (hence, representing part of the time/frequency resources where the sensing RS exists without superimposition of other signals), the superimposed sensing RS 512, as well as the time/frequency resources 514 with which the sensing RS may not be superimposed.

In some embodiments, an indication/configuration of some signal types at the same time/frequency resources associated with a sensing RS automatically indicates that the coexisting sensing RS resources will be treated as superimposed sensing RS resources. In some embodiments, this includes an indication of a new transmit power level or a transmit power reduction for the superimposed resources. In some embodiments, an indication/configuration of some signal types at the same time/frequency resources associated with a sensing RS automatically indicates that the associated sensing RS resources conflicting with the newly indicated resources shall be excluded from the active sensing RS resources (treated with zero power).

Signaling Implementation for Superimposed Sensing RS

In some embodiments, parameters defining a superimposed sensing RS, the set of time-frequency resources as a subset of the sensing RS which are superimposed with another signal, the set of time-frequency resources where sensing RS resources may not be superimposed and/or indication of the transmit power level/ratio for all or parts of the sensing RS resources are indicated dynamically via physical downlink control channel (PDCCH) downlink control information (DCI), or via multi-cast signaling with a group common DCI with the cyclic redundancy code (CRC) scrambled with a group-common radio network temporary identifier (RNTI), or semi-statically via RRC signaling with an activation/deactivation indicated via a medium access control-control element (MAC-CE) or via a DCI.

In some embodiments, an indication of a first time/frequency resources belonging to another signal, whose resources, at least for part of the corresponding resource elements (Res), coexist with a previously configured second time/frequency resources of a sensing RS, automatically indicate that the sensing RS is superimposed in the shared resources of the indicated first time/frequency resources. In some embodiments, the indication of the first time/frequency resources indicate that the sensing RS is muted over the shared resources, if indicated explicitly, or implicitly depending on the type of the configured signal/instruction via the first time/frequency resources. In some embodiments, the indication of the first time/frequency resources to a sensing Tx or sensing Rx nodes are accompanied with an action type that is applicable on the shared time/frequency resources of the sensing RS. In some embodiments, the action type may include a sensing RS transmit power reduction on the shared resources, a power boost on the non-superimposed resources, muting of the superimposed resources, or a combination thereof. In some embodiments, such indications are done dynamically via dedicated or group common PDCCH DCI.

Interference Management for Superimposed Sensing RS

In another embodiment, a network node which is not participating in a sensing task associated with a configured superimposed sensing RS receives a configuration of a superimposed sensing RS, including a set of time/frequency resource pattern for the sensing RS or a subset thereof, a signal sequence indication for sensing RS, or a subset of the superimposed sensing RS-defining parameters, over which the network node is indicated to perform at least one of:
  interference measurement,
  interference measurement reporting to another network
    node,
  channel estimation,
  interference estimation and subtraction,
  perform modulation and coding scheme (MCS) update
    and rate matching over the indicated superimposed
    resources.

In some embodiments, where the superimposed sensing RS includes resources with no superimposition (i.e., not superimposed within a specific time/frequency resource), the sensing RS resource (or all or a subset of all resources with this property) is indicated for non-sensing devices. In some embodiments, the resources, not-superimposed resources within a superimposed sensing RS, are amplified (transmitted with a higher power) compared to the rest of the sensing RS resources which are superimposed and/or not indicated to the non-sensing nodes. In some embodiments, the resources are indicated to the UEs where the UE performs measurements over the indicated resource over a single or multiple Rx beams, report the measurements which are done over the resources and single/multiple beams, or a combination thereof. In some embodiments, the UEs indicated with the time/frequency resources of a sensing RS are indicated to transmit a report to the network if the measured interference power is above an indicated threshold, if the measured reference signal received quality (RSRQ) is above an indicated threshold, if the measured RSRQ is below an indicated threshold, or a combination thereof. In some embodiments, the measurement and threshold values correspond to the lowest or higher measured value among the UE Rx beams or correspond to one or multiple indicated UE beams indicated by the network via a quasi co location (QCL) type-D assumption.

As a result of the measurements on the non-superimposed resources, the UE may choose a proper Rx beam for reception (thereby reducing interference from the sensing RS transmission), employ a successive interference cancellation strategy, where the sensing RS is a priori known to the UE and the received interference due to the superimposed sensing RS is estimated and subsequently subtracted employing the non-superimposed resources as reference signals for interference channel estimation.

Conditional Superimposition Via Power/Beam Isolation Control

In some embodiments, the superimposed signals are transmitted and/or received via separate beams. In some embodiments, the superimposition of the sensing RS with other RS or data/control channels are allowed, only when the transmit power level for the superimposed sensing RS, or the superimposed portion of the sensing RS compared to another signal (i.e., another RS or data/control channel with which the sensing RS is superimposed) is lower than X dB. In some embodiments, the superimposition is allowed when the superimposed beams are isolated with at least Y dB, or when another RS or physical channel by which the sensing RS is superimposed enjoy more than Y dB of isolation from the superimposed sensing RS beam. In some implementations, the beam isolation is measured as the separation achieved via radiation pattern isolation at the transmit side, or a measured isolation at the receiver side.

In some embodiments, when the sensing RS and an RS or data/physical channel is superimposed and the data/RS sequence is utilized for the superimposed sensing sequence (e.g., a case where an RS or a data channel transmission is also used for sensing but with the additional help of a sensing RS which only amplifies the other RS or data channel by increasing its power and/or augmenting the Tx beam) the superimposition is allowed when the superimposed beams are isolated with at most Z dB. In some embodiments, different/multiple X or Y or Z values are defined, corresponding to different RS and/or (data or control) physical channels and/or different application type of sensing RS (if it is transmitted via a full-duplex node) or priority of the sensing RS (if the sensing task is urgent or of high priority). In some embodiments, the superimposition of the sensing RS with other RS or data/control channels are allowed under a condition defined jointly using X and Y and Z values or a subset thereof. As an example, a sensing RS may be allowed to be superimposed with a physical uplink shared channel (PUSCH) transmission with a separated sensing RS sequence in a UE, when the total Tx power isolation (through Tx power and Tx beam separation, i.e., X+Y) is above an indicated threshold. As an alternative example, a sensing RS may be allowed to be superimposed with a PUSCH transmission via the same sequence in a UE, when the beam isolation is below an indicated threshold. Any of the values of X, Y, Z may be defined semi-statically or dynamically by the network.

The above criteria can be indicated by the network to the UE nodes both to enable the use of superimposition multiplexing, when the UE is operating as a sensing Tx, or to measure/verify a given superimposition condition, e.g., the UE provides feedback if some superimposition multiplexing is allowed according to the defined condition set.

In some embodiments, the capability of the UE for the transmission of the superimposed sensing RS, the type of the supported superimposed RS patterns for transmission and/or reception (processing), the maximum processing block length in time and/or frequency domain, the type of the superimposed sensing RS interference measurement/resolution (via successive interference cancellation of the superimposed sensing RS, Rx beam adjustment) as well as the conditions on the employment of the superimposed RS (affordable value ranges for X,Y,Z) are communicated to the network as part of the UE capability definition. The configuration of the superimposed sensing RS Tx and Rx/processing is then configured by the network employing the defined capability set.

DMRS Protection/Augmentation With Superimposed Sensing RS

In some embodiments, when the sensing RS is superimposed with another physical data/control channel, the RS (e.g., demodulation reference signal (DMRS) phase tracking reference signal (PTRS)) within the data/control channel is multiplexed with sensing RS symbols in time domain, frequency domain, or via separable orthogonal/non-orthogonal code blocks. In some embodiments, the sensing RS contains information targeting an information receiver, e.g., recipient of physical downlink shared channel (PDSCH) (not necessarily the same as the sensing Rx). In this case, the sensing sequence is composed of a combination of the information-containing elements as well as the symbols dedicated for other RS, e.g., DMRS for the transmitted data/control channel. In some embodiments, when the superimposed sensing RS contains information towards an information receiver, the combination of the sensing RS and the superimposed data/control channel constitute a single layer transmission towards the same information receiver (the data/control channel contains the same sequence/symbol values as the superimposed sensing RS). In some alternate embodiments, the combination of the sensing RS and the superimposed data/control channel constitutes a multi-layer communication with an information receiver, a single layer communication towards multiple information receivers, or a combination thereof. In any of the embodiments, the RS/DMRS within the sensing RS is also superimposed with the concurrent transmissions, or it is multiplexed with the superimposed transmissions (at the corresponding occasions to the e.g., DMRS transmissions) in a time domain, a frequency domain, a code domain, or a combination thereof.

In some of the embodiments, when the sensing RS utilizes a variable beam or multiple sensing RS are multiplexed in time with different beams (e.g., in order to perform beam sweeping for target detection), a DMRS pattern is defined as augmented DMRS in order to compensate for the beam variations.

Figures 1, 2, 3, 6:
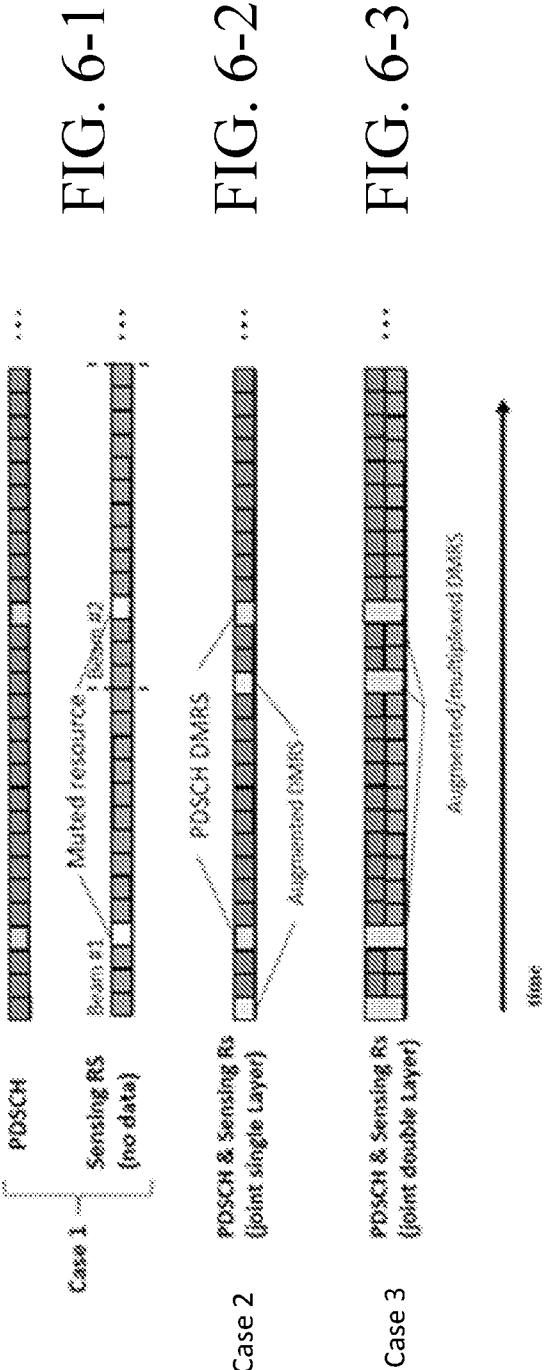

Referring now to FIGS. 6-1 thru 6-3, in another embodiment, example joint transmissions of a physical data/control channel and information-containing sensing RS with variable beam (or subsequence sensing RS with different beams) are presented. In Case 1 (FIG. 6-1), the sensing RS resources co-existing with DMRS occasions are muted. In Case 2 (FIG. 6-2), the sensing RS (including the variable beam) and the constant (gray) beam share the same sequence and jointly perform a single layer PDSCH transmission. In Case 3 (FIG. 6-3), the sensing RS carries information, and together with the constant (gray) beam constitute a joint two-layer PDSCH transmission. In both Case 2 and Case 3, in order to combat the beam variations during sensing RS transmission, additional DMRS symbols are introduced.

In some embodiments, the augmented DMRS pattern is implicitly defined, as a function of the sensing RS pattern, beam sweeping pattern, channel delay/doppler spread, or a combination thereof. In some embodiments, the augmented DMRS pattern is defined independently or a as a function of the parameters, in addition to a communicated information, e.g., an index representing an entry from a codebook, whereby the augmented DMRS pattern can be uniquely identified.

In some embodiments, when the DMRS (or other RS) within an information containing sensing RS transmission is multiplexed with other information containing transmission in a time domain or a frequency domain, or when the DMRS (or other RS) within a data/control channel is multiplexed with the transmission of information containing the sensing RS, the information-containing REs (from one transmission) corresponding to the multiplexed DMRS locations (from another transmission) are muted. In this case, the information containing transmission is rate-matched around the muted REs, e.g., to support the introduction of the augmented DMRS due to the variable-beam sensing RS.

Data-RS Leakage Handling at the Sensing Tx

In some embodiments, the sensing Tx with a superimposed sensing RS is requested to report a measure of leakage between the transmitted sensing RS and the superimposed signal at the transmitter side, e.g., a cross correlation of the two or multiple superimposed signals. In some embodiments, the sensing Tx with a superimposed sensing RS adjusts the transmitted signal with which the sensing RS is superimposed in order to reduce the leakage from the transmitter side, via at least one of the following actions:

Muting an RE within the superimposed signal (a data/control channel or another RS) with the superimposed sensing RS;

Performing rate matching around the muted resource at the transmitter side for the signal superimposed with the sensing RS;

Replacing the muted resource with a value to reduce the cross correlation of the sensing RS with the superimposed signal; or Replacing the muted resource with a value to reduce the cross correlation of the sensing RS with the superimposed signal transmitted via the same node.

Enabling Superimposition in Delay-Doppler Domain or Another Waveform/Transformed Domain In some embodiments, the superimposed sensing RS is using a different waveform as the coexisting data/control channel. In an alternate embodiment, the superimposition of sensing RS with another sensing RS, or data/control channel is performed following a pre-filtering stage in time/frequency/space domain. In some embodiments, the supported time/frequency/space domain filters for transmission, the supported time/frequency filters for reception/processing, the supported alternate waveforms for superimposed transmission, the supported alternate waveforms for superimposed reception/processing, a criterion for the support of each of the features or a combination thereof/communicated as the node capability. When a sensing RS is configured with another waveform or a time/frequency/space pre-filtering stage, the type of the waveform and the pre-filtering process is indicated via an index from a joint or a separate codebook, where the codebook includes possible waveform combination possibilities for the sensing RS and/or the time/frequency/beam pre-filtering stage.

In one embodiment, the sensing RS is defined and superimposed with the other RS and/or data channels in the delay-doppler domain, where the environment remains static in the delay-doppler sense. In some embodiments, the sensing RS as well as the data/control channels jointly utilize the delay doppler domain, e.g., via an implementation of the orthogonal time frequency space (OTFS) waveform.

In some embodiments, the superimposed sensing RS with another signal utilizes a same waveform, but with different waveform parameters than those used by the other signal. In some embodiments, the superimposed sensing RS utilizes a larger cyclic prefix (CP) duration and/or a different SCS compared to the other signal by which it is superimposed. In some embodiments, a specific waveform parameter is defined to a group of UEs which perform a sensing task for sensing, for sensing or jointly for communication and sensing via the indicated waveform parameters. In some embodiments, indication of a waveform parameter set is jointly done with a beam indication for sensing, for communication, or jointly for sensing and communication.

Referring to FIG. 7, an embodiment illustrates a process 700 for superimposing sensing RS with other signals. At a block 702, at a first device (the UE or the gNB), a first configuration is received from a second device (the UE, the gNB). At a block 704, a second configuration is received from the second device. At a block 706, a first transmission of the sensing RS and another signal is generated based on the first and second configurations responsive to the first device being identified as a transmitting device. At a block 708, receive a second transmission from a third device of the sensing RS and another signal is generated based on the first and second configurations responsive to the first device being identified as a receiving device and process the received second transmission according to the first and second configurations.

A. A method performed at a first device includes receiving a first configuration for a sensing RS from a second device and receiving a second configuration for another signal. The first and second configurations identify a sharing of resources for allowing the sensing RS to be at least partially superimposed with the another signal. Responsive to the first device being identified as a transmitting device, a first transmission of the sensing RS and the another signal based on the first and second configurations is generated. Responsive to the first device being identified as a receiving device, a second transmission is received from a third device. The second transmission includes the sensing RS and the another signal based on the first and second configurations. Responsive to receiving the second transmission, the second transmission is processed based on the first and second configurations.

B. The method of A, wherein the resources associated with the sensing RS that allow the sensing RS to be at least partially superimposed with the another signal include a time resource, a frequency resource, a code resource, or some combination thereof.

C. The method of A or B, wherein the resources associated with the another signal that allow the sensing RS to be at least partially superimposed with the another signal include a physical data channel, a control channel, a reference signal, or a combination thereof.

D. The method of any of A-C, wherein at least the sensing RS superimposed with the another signal is non-orthogonal to the another signal in a time domain, a frequency domain, a code domain, or some combination thereof.

E. The method of any of A-D, wherein the sensing RS includes a plurality of portions, wherein all of the plurality of portions are superimposed with one portion or plurality of portions of the another signal.

F. The method of any of A-E, wherein a portion of the another signal is identified as not being able to be superimposed with the sensing RS.

G. The method of any of A-F, wherein the sensing RS includes a plurality of portions, wherein a portion of the sensing RS is identified as not being able to be superimposed with the another signal.

H. The method of any of A-G, wherein the sensing RS includes previously determined interference measurements associated with a previously received sensing RS I. The method of any of A-H, wherein the sensing RS uses a different waveform as a waveform for superimposed portions of the another signal.

J. The method of any of A-I, further comprising determining a signal leakage between the sensing RS and the superimposed another signal; and adjusting the generated transmission responsive to the determined measure of signal leakage.

K. The method of J, wherein the adjusting comprises: muting a resource element (RE) within the another signal with the sensing RS; performing rate matching around the muted RE for the another signal; and replacing the muted RE with a value configured to reduce a cross correlation of the sensing RS with the another signal.

L. The method of J, wherein the adjusting comprises: removing the signal leakage from the sensing RS by orthogonalizing a sequence of signal values which are transmitted in a set of REs to a sequence of signal value which are transmitted in a set of REs from the same device; removing the signal leakage from the sensing RS by orthogonalizing the transmitted signal sequence to a plurality of sensing RS sequences; enforcing a zero-mean property for the another signal with the sensing RS, or some combination thereof.

M. The method of any of A-L, wherein the another signal includes an indication of a transmit power reduction for a resource used by the sensing RS.

N. The method of M, wherein the indication of transmit power reduction indicates that a transmit power for the resource used by the sensing RS is smaller than a transmit power for a resource used by the another signal.

O. The method of any of A-N, wherein resources of the sensing RS which are not superimposed include an indication of channel estimation.

P. The method of O, further comprising generating a report of channel estimation over the resources of the non-superimposed sensing RS; and sending the generated report.

Q. The method of O, further comprising estimating interference of the sensing RS resources; and subtracting of the estimated interference from the sensing RS resources.

R. The method of any of A-Q, where a set of multiple time/frequency/beam resources are indicated for the transmission of a superimposed sensing RS, further comprises receiving a configuration for an augmented DMRS for a physical data/control channel superimposed with the sensing RS.

S. The method of any of A-R, wherein the first and second configurations are indicated dynamically, via a dedicated DCI signaling, a group common DCI for group indication, or semi-statically via RRC signaling with activation indicated via a DCI, a MAC-CE, or a combination thereof.

T. The method of any of A-S, further comprising receiving configuration for interference measurement, interference measurement reporting, interference reduction, wherein the configuration for interference measurement, interference measurement reporting, interference reduction, or a combination thereof is indicated dynamically, via a dedicated DCI signaling, a group common DCI for group indication, or semi-statically via RRC signaling with activation indicated via a DCI or a MAC-CE.

U. An apparatus comprising a processor and a memory coupled to the processor, the memory comprising instructions executable by the processor to cause the apparatus to receive a first configuration for a sensing RS, receive a second configuration for another signal, wherein the first and second configurations identify a sharing of resources for allowing the sensing RS to be at least partially superimposed with the another signal, responsive to the apparatus being identified as a transmitting device, generate a first transmission of the sensing RS and the another signal based on the first and second configurations, and responsive to the apparatus being identified as a receiving device, instruct the receiver to receive from a third device a second transmission including the sensing RS and the another signal based on the first and second configurations and process the second transmission based on the first and second configurations.

V. The apparatus of U, wherein the instructions are further executable by the processor to cause the apparatus to determine a signal leakage between the sensing RS and the superimposed another signal and adjust the generated transmission responsive to the determined measure of signal leakage by muting a resource element (RE) within the another signal with the sensing RS, performing rate matching around the muted RE for the another signal, and replacing the muted RE with a value configured to reduce a cross correlation of the sensing RS with the another signal by removing the signal leakage from the sensing RS by orthogonalizing a sequence of signal values which are transmitted in a set of resource elements (REs) to a sequence of signal value which are transmitted in a set of REs from the same device, removing the signal leakage from the sensing RS by orthogonalizing the transmitted signal sequence to a plurality of sensing RS sequences, and enforcing a zero-mean property for the another signal with the sensing RS, or some combination thereof.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a first configuration for a reference signal (RS) from a base station;
   receiving a second configuration for another signal from the base station, wherein the first configuration and the second configurations identify a sharing of resources for allowing the RS to be at least partially superimposed with the another signal;
   in response to the UE being identified as a transmitting device, generating a first transmission of the RS and the another signal based on the first configuration and the second configurations; and
   in response to the UE being identified as a receiving device, receiving from a third device a second transmission including the RS and the another signal based on the first configuration and the second configurations and processing the second transmission based on the first configuration and the second configurations.

2. The method of claim 1, wherein:
   the resources associated with the RS that allow the RS to be at least partially superimposed with the another signal include a time resource, a frequency resource, or a code resource, or some a combination thereof; and
   the resources associated with the another signal that allow the RS to be at least partially superimposed with the another signal include a physical data channel, a control channel, or a reference signal, or a combination thereof.

3. The method of claim 1, wherein at least the RS superimposed with the another signal is non-orthogonal to the another signal in a time domain, a frequency domain, or a code domain, or a combination thereof.

4. The method of claim 1, wherein the RS includes a plurality of portions, wherein all of the plurality of portions are superimposed with one portion or plurality of portions of the another signal and wherein a portion of the RS is identified as not being able to be superimposed with the another signal.

5. The method of claim 1, wherein a portion of the another signal is identified as not being able to be superimposed with the RS.

6. The method of claim 1, wherein the RS includes previously determined interference measurements associated with a previously received RS.

7. The method of claim 1, wherein the RS uses a different waveform, a different subset of waveform-defining parameters as a waveform, or a different waveform-defining parameters, or a combination thereof than for superimposed portions of the another signal.

8. The method of claim 1, further comprising:

determining a signal leakage between the RS and the superimposed another signal; and adjusting the generated transmission responsive to the signal leakage, the adjusting comprises:

muting a resource element (RE) within the another signal with the RS;

performing rate matching around the muted RE for the another signal; and replacing the muted RE with a value configured to reduce a cross correlation of the RS with the another signal, according to a predefined criteria, the replacing comprises:

removing the signal leakage from the RS by orthogonalizing a sequence of signal values which are received in a set of resource elements (REs) to a sequence of signal values which are transmitted in a set of REs;

removing the signal leakage from the RS by orthogonalizing the transmitted signal sequence to a plurality of RS sequences; or enforcing a zero-mean property for the another signal with the RS;

or a combination thereof.

9. The method of claim 1, wherein the another signal includes an indication of a transmit power reduction for a resource used by the RS, the indication of transmit power reduction indicates that a transmit power for the resource used by the RS is smaller than a transmit power for a resource used by the another signal.

10. The method of claim 1, wherein resources of the RS which are not superimposed include an indication of channel estimation and wherein the method further comprising:

generating a report of channel estimation over the resources of the RS which are not superimposed; and sending the generated report, if configured;

estimating interference of the RS resources; and subtracting of the estimated interference from the RS resources, if configured.

11. The method of claim 1, where a set of multiple time/frequency/beam resources are indicated for the transmission of a superimposed RS, and the method further comprises receiving a configuration for an augmented DMRS for a physical data/control channel superimposed with the RS.

12. The method of claim 1, wherein the first configuration and the second configurations are indicated dynamically, via a dedicated DCI signaling, a group common DCI for group indication, or semi-statically via RRC signaling with activation indicated via a DCI, or a MAC-CE, or a combination thereof.

13. The method of claim 1, further comprising receiving configuration for interference measurement, interference measurement reporting, interference reduction, wherein the configuration for interference measurement, interference measurement reporting, or interference reduction, or a combination thereof is indicated dynamically, via a dedicated DCI signaling, a group common DCI for group indication, or semi-statically via RRC signaling with activation indicated via a DCI or a MAC-CE.

14. The method of claim 1, further comprising performing interference cancellation on the RS and the another signal that are at least partially superimposed.

15. A user equipment (UE), comprising:

at least one memory;

at least one processor coupled with the at least one memory and configured to cause the UE to:

receive a first configuration for a reference signal (RS);

receive a second configuration for another signal, wherein the first configuration and the second configurations identify a sharing of resources for allowing the RS to be at least partially superimposed with the another signal;

in response to the UE being identified as a transmitting device, generate a first transmission of the RS and the another signal based on the first configuration and the second configurations; and in response to the UE being identified as a receiving device, instruct the receiver to receive from a third device a second transmission including the RS and the another signal based on the first configuration and the second configurations and process the second transmission based on the first configuration and the second configurations.

16. The UE of claim 15, wherein the at least one processor is configured to cause the UE to:

determine a signal leakage between the RS and the superimposed another signal; and adjust the generated transmission responsive to the determined signal leakage by:

muting a resource element (RE) within the another signal with the RS;

performing rate matching around the muted RE for the another signal; and replacing the muted RE with a value configured to reduce a cross correlation of the RS with the another signal by:

removing the signal leakage from the RS by orthogonalizing a sequence of signal values which are received in a set of resource elements (REs) to a sequence of signal value which are transmitted in a set of REs;

removing the signal leakage from the RS by orthogonalizing the transmitted signal sequence to a plurality of RS sequences; or enforcing a zero-mean property for the another signal with the RS;

or a combination thereof.

17. The UE of claim 15, wherein the at least one processor is configured to cause the UE to perform interference cancellation on the RS and the another signal that are at least partially superimposed.

18. A processor for wireless communication, comprising:

at least one controller coupled with at least one memory and configured to cause the processor to:

receive a first configuration for a reference signal (RS);

receive a second configuration for another signal, wherein the first configuration and the second configuration identify a sharing of resources for allowing the RS to be at least partially superimposed with the another signal;

in response to the processor being identified as a transmitting device, generate a first transmission of the RS and the another signal based on the first configuration and the second configurations; and in response to the processor being identified as a receiving device, instruct the receiver to receive from a third device a second transmission including the RS and the another signal based on the first configuration and the second configurations and process the second transmission based on the first configuration and the second configurations.

19. The processor of claim 18, wherein the at least one controller is configured to cause the processor to:

determine a signal leakage between the RS and the superimposed another signal;

and adjust the generated transmission responsive to the determined signal leakage by:

muting a resource element (RE) within the another signal with the RS;

performing rate matching around the muted RE for the another signal; and replacing the muted RE with a value configured to reduce a cross correlation of the RS with the another signal by:

removing the signal leakage from the RS by orthogonalizing a sequence of signal values which are received in a set of resource elements (REs) to a sequence of signal value which are transmitted in a set of RES;

removing the signal leakage from the RS by orthogonalizing the transmitted signal sequence to a plurality of RS sequences; or enforcing a zero-mean property for the another signal with the RS;

or a combination thereof.

20. The processor of claim 18, wherein the at least one controller is configured to cause the processor to perform interference cancellation on the RS and the another signal that are at least partially superimposed.

* * * * *